United States Patent [19]

Rhodes

[11] 3,994,809

[45] Nov. 30, 1976

[54] CENTRIFUGAL SEPARATOR WITH VISCOSITY DIFFERENTIATING ADHESION MEANS

[76] Inventor: Herbert M. Rhodes, P.O. Box 16011, Houston, Tex. 77022

[22] Filed: Apr. 28, 1975

[21] Appl. No.: 572,327

[52] U.S. Cl. .............................. 210/78; 210/360 R; 210/367; 210/374; 210/522; 210/DIG. 5; 233/2; 210/380 R
[51] Int. Cl.² ...................... B01D 33/02; B04B 3/00
[58] Field of Search .............. 210/83, 84, 78, 242 R, 210/243, 338, 342, 374, 360 R, 361, 365, 367, 380, 522, DIG. 5, DIG. 21; 233/2, 46, 27

[56] References Cited
UNITED STATES PATENTS

| 579,301 | 3/1897 | Lundstrom | 210/365 |
|---|---|---|---|
| 651,621 | 6/1900 | Black et al. | 210/342 |
| 1,360,708 | 11/1920 | Avrutik | 233/2 |
| 1,981,924 | 11/1934 | Reese et al. | 233/46 |
| 2,312,829 | 3/1943 | Bird et al. | 210/73 |
| 2,432,317 | 12/1947 | Lawson et al. | 210/DIG. 5 |
| 2,695,133 | 11/1954 | Drury | 233/2 |
| 2,710,718 | 6/1955 | Denman | 233/27 |
| 2,799,394 | 7/1957 | Boogaard | 210/73 |
| 3,233,742 | 2/1966 | Shanes et al. | 210/526 |
| 3,236,768 | 2/1966 | Litt | 210/23 |
| 3,283,910 | 11/1966 | Grieselhuber et al. | 210/380 |
| 3,410,410 | 11/1968 | Hofmann | 210/78 |
| 3,638,854 | 2/1972 | Gronow | 233/2 |
| 3,810,832 | 5/1974 | Rhodes | 210/DIG. 21 |
| 3,865,722 | 2/1975 | Stoddard | 210/DIG. 21 |

Primary Examiner—Frank W. Lutter
Assistant Examiner—Frank Sever
Attorney, Agent, or Firm—Morton, Bernard, Brown, Roberts & Sutherland

[57] ABSTRACT

A method of and an apparatus for separating a fluid including a plurality of fluid components of different viscosities. The fluid is centrifugally accelerated and contacts a solid viscosity differentiating adhesion means. The degree of adhesion of the different viscosity fluid components to the solid viscosity differentiating adhesion means varies proportionally with the viscosity of the fluid component. The trajectory of each fluid component on emerging from the solid viscosity differentiating adhesion means varies in accordance with the degree of adhesion of each fluid component to that adhesion means. The fluids are physically separated by placing between the trajectories of each of the fluid components a partition which defines a receptacle for collection of each of the component fluids.

25 Claims, 4 Drawing Figures

CENTRIFUGAL SEPARATOR WITH VISCOSITY DIFFERENTIATING ADHESION MEANS

BACKGROUND OF THE INVENTION

The present invention relates to a method of and an apparatus for the continuous separation of a fluid body comprised of a plurality of component fluids of different viscosities.

At the present time much distressed or otherwise unusable crude oil and some refined oil is disposed of by destructive methods rather than being reclaimed. To a great extent this is because apparatus presently available to achieve the separation of a fluid body comprising a plurality of fluid components of different viscosities into the separate component fluids is generally bulky, complicated, and costly, with the result that reclamation is economically unattractive.

The present invention makes it economically feasible to reclaim distressed, or otherwise unusable, crude oils and some of the refined oils that are now being disposed of by destructive methods. By means of the present invention, in conjunction with conventional equipment, it is possible to remove the impurities in used motor oils to a degree where these oils have sufficient economic value to be recycled. The present invention thus adds oil to improve our nation's energy situation and mitigates some of the disposal problems associated with the oil and chemical industries by economically separating their waste products, thereby reducing pollution. Further, the present invention separates oil and water, or any similar fluids, and as an ancillary function, additionally separates some of the particulate matter contained therein.

SUMMARY OF THE INVENTION

The degree of adhesion of a fluid to a solid surface is dependent, at least in part, on the viscosity of the fluid. Advantage is taken of this principle in the present invention. A fluid body is subjected to centrifugal forces, causing the fluid body to contact a solid adhesion means with the result that the lower viscosity fluid components of the fluid body require less acceleration to disengage from the solid adhesion means than do the higher viscosity fluid components. Consequently, the component fluids of the fluid body leave the solid adhesion means in trajectories dependent upon their viscosity, with the result that fluid components having higher viscosities travel in a different direction from the fluid components with the lower viscosities, thereby effecting separation of the fluid components. The solid adhesion means is thus a solid viscosity differentiating adhesion means.

The general mechanical configuration of the present invention consists of a driven rotor plate, a solid viscosity differentiating adhesion means connected to that rotor plate, and a housing having receptacles for the fluid components. The fluid body is fed to the rotor plate where it is centrifugally accelerated outwardly in a plane perpendicular to the axis of rotation to contact the solid viscosity differentiating adhesion means from which it is directed into the receptacles which are mounted in, and form a part of, the housing. The solid viscosity differentiating adhesion means is angled with respect to the plane of acceleration, with the result that the component fluids having the higher viscosities travel further on the angled solid adhesion means before acquiring sufficient centrifugal acceleration to disengage from the solid viscosity differentiating adhesion means and pass into their respective receptacles. The component fluids with lower viscosities acquire the necessary disengagement centrifugal acceleration while closer to the plane of acceleration and so pass to other receptacles.

DETAILED DESCRIPTION OF THE DRAWINGS

To further describe the invention, and a preferred embodiment thereof, reference is made to the drawings appended hereto in which like symbols refer to like or corresponding parts throughout the several views. In the drawings.

Figure 1:
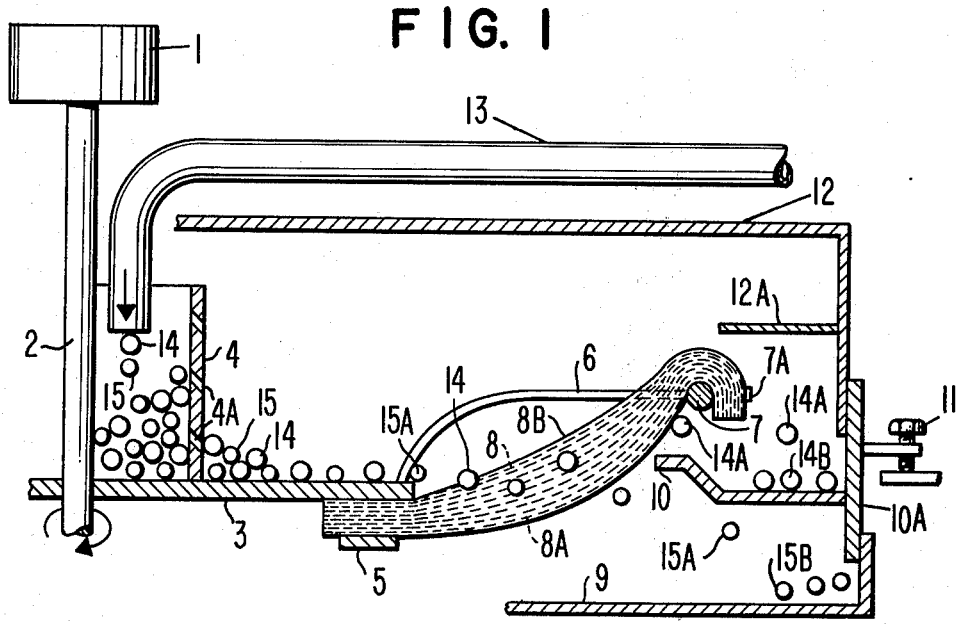
FIG. 1 is a partial side sectional view of a preferred embodiment of an apparatus for separation of varying viscosity fluid components of a fluid body in accordance with the present invention.

Referring to FIG. 1, a drive motor 1 rotates a shaft 2 on which a rotor plate 3 is attached concentrically. Fluid distributor partition 4, with distribution ports 4A, is affixed to rotor plate 3 concentrically with respect to shaft 2. Ring support arms 6 are attached on the outer periphery of rotor plate 3 to support a concentrically affixed ring 7. One end of solid viscosity differentiating adhesion means 8, depicted in the form of a fibrous mass, is attached to rotor plate 3 by clamping member 5. Solid viscosity differentiating adhesion means 8 extends out and over (or under) supporting ring 7 and has its second end affixed thereto by means of a clamp 7A. The entire assembly, consisting of the shaft 2, rotor plate 3, fluid distributor partition 4, clamping member 5, support arm 6, ring 7, and solid viscosity differentiating adhesion means 8, rotates about the axis of shaft 2 under the urging of drive motor 1. This entire assembly is within a housing made up of lower housing portion 9 and upper housing portion 12 which are joined together by vertically adjustable slip fitting 10A. Fluid inlet pipe 13 passes through upper housing 12 to discharge fluid within fluid distributor partition 4.

Supporting ring 7 is above rotor plate 3, and so solid viscosity differentiating adhesion means 8 is angled upwardly. Alternatively, supporting ring 7 could be below rotor plate 3, with solid viscosity differentiating adhesion means 8 angled downwardly.

On the interior of the upper housing 12 is mounted a fixed-position partition 12A which defines a first receptacle to receive and retain separated high viscosity fluids and particulate matter that may be entrained in the fluid body. Partition 10 is a part of a slip fitting 10A between lower receptacle 9 and upper housing 12 and provides a second receptacle. Slip fitting 10A may be adjusted, up or down in elevation, by means of adjustment screws 11, thus adjusting the elevation of receptacle 10. A lower receptacle is defined beneath partition 10 by lower housing portion 9.

Figure 2:
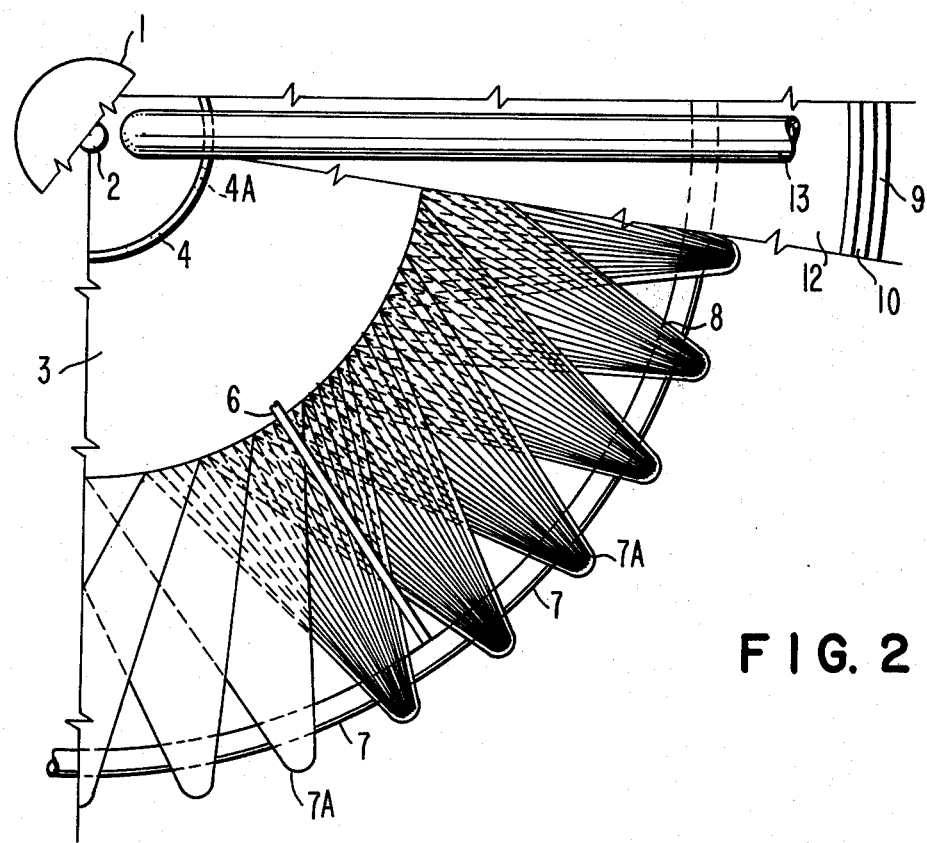
FIG. 2 is a fragmentary top plan view of the apparatus of FIG. 1.

The solid viscosity differentiating adhesion means 8 in the specific embodiment of FIGS. 1 and 2 is depicted as a fibrous mass which consists of longitudinally oriented fibers, ribbons, filaments, or mono-filaments in clusters. The clusters may consist of any fibrous-like material including, but not limited to, steel, stainless steel, or other forms of iron; copper or other copper bearing metals; nickel or other nickel bearing metals; aluminum; or any metal that can be fibered with sufficient strength and not be corroded by the fluids being separated; natural fibers such as cotton, wool, wood, hemp, hay and straw; most commercial plastics including commercial plastic fibers, films, filaments, ribbons, and mono-filaments such as the cellulose acetates, nylon, polycarbonates, polyethylene, polypropylene, fluorocarbons, and polyurethanes. The fluorocarbons and polished stainless steels are perhaps the best for commercial application; however, polyethylene and polypropylene are very satisfactory.

The upper portion 8B of solid viscosity differentiating adhesion means 8 consists of fibers generally in the order of 12-mils in diameter or larger, and the fibers at the lower portion 8A of solid viscosity differentiating adhesion means 8 are generally in the order of 6-mils in diameter, each dimension being plus or minus about 3-mils. The overall thickness of the fibrous-like cluster 8 runs preferably in the order of from about 4 to about 12 inches, with the outer end attached to the ring 7 made as small as practical. The effective length of the solid viscosity differentiating adhesion means 8, between the outer perimeter of plate 3 and the ring 7 usually falls between about 6 and 24-inches.

The degree of symmetry indicated in FIG. 2 for the fibers, ribbons, filaments, or mono-filaments of solid adhesion means 8 is not required. Better performance is obtained when the outer ends toward the ring 7 are compactly bound together.

Figure 3:
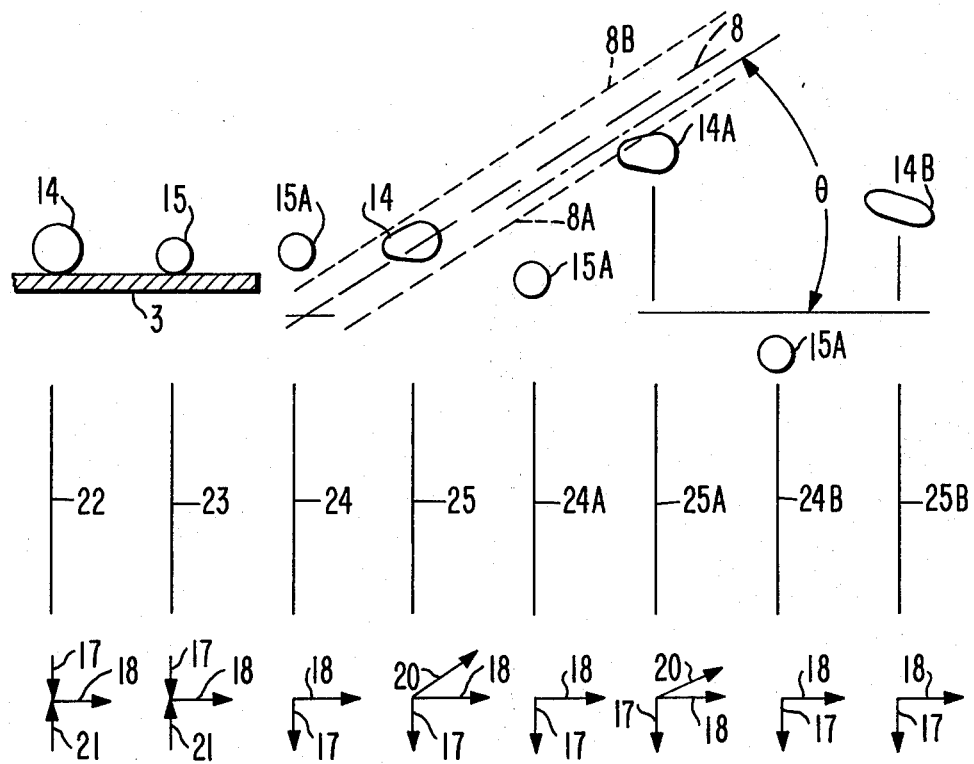
FIG. 3 is an elementary force diagram explanatory of the operation of the embodiment depicted in FIG. 1.

FIG. 3 assists in the explanation of the operation of the continuous viscosity differentiating centrifuge. The upper portion of FIG. 3 is an expanded diagram of certain of the components of FIG. 1, and the lower portion is an elementary vector diagram from which the rotational forces have been omitted for simplicity of illustration. The fluid and centrifugal force flow is from left to right in FIG. 3. The vertical lines are uniform time-distance indicators. Angle $\theta$ in FIG. 3 is the angle of orientation between solid viscosity differentiating adhesion means 8 and the plane of rotation of rotor plate 3, in which plane particles 14 and 15 migrate outwardly on rotor plate 3 due to centrifugal acceleration. Angle $\theta$ is an acute angle and preferably is an angle of from about 5° to about 30°. Generally, more viscous fluids tend to form particles of a larger size, and by way of example, the particles 14 of the higher viscosity component fluid may be in the order of about 0.025 mm diameter or somewhat larger, while particles 15 of the lower viscosity component fluid may be considerably less than 0.025 mm diameter.

Particles 14 and 15 emerge through ports 4A from the fluid distributor partition 4, where they have been discharged by pipe 13 onto rotor plate 3. The first position indicator 22 nearest partition 4 indicates the instantaneous position of a particle 14 of the higher viscosity component fluid, while the force diagram pertaining to that particle 14 is depicted directly below position indicator 22 and includes a gravity vector 17, a rotor plate 3 reaction force vector 21, and a centrifugal force vector 18, neglecting the adhesion of the higher viscosity component fluid 14 to rotor plate 3. The net force thus causes particle 14 to accelerate from left to right. The second position indicator 23 marks the position of a particle 15 of the lower viscosity component fluid, and its force vectors 17, 18 and 21 are indicated immediately below. The same forces are acting on this particle 15 as on the higher viscosity component fluid particle 14, with the same results.

The centrifugal force vectors 18 cause fluid particles 14 and 15 to migrate outwardly on rotor plate 3 until they disengage from the outer edge thereof. After the component fluid particle 15 disengages from the outer edge of rotor plate 3, it is in free fall, as indicated in FIG. 3 by particle 15A, being acted upon by the gravitational force vector 17 and the centrifugal force vector 18 adjacent position indicator 24. Lower viscosity particle 15A has only slight adherence to the fibrous mass of solid viscosity differentiating adhesion means 8. Consequently, particle 15A continues in free fall, with only slight mechanical interference from solid viscosity differentiating adhesion means 8, as depicted by particle 15A at position indicators 24A and 24B.

As the higher viscosity component fluid particles 14 disengage from rotor plate 3, they impinge on the fibers of solid viscosity differentiating adhesion means 8 to which they adhere because of their natural affinity, and the bond or degree of adherence is proportional to the viscosity; the higher the viscosity, the tighter the bond, and vice versa. Because the fluid component particles 14 adhere to the fibers of solid viscosity differentiating adhesion means 8, the particles 14 experience not only the gravitational force vector 17 and the centrifugal force vector 18, but also a force vector 20 acting in the direction of the angling of solid adhesion means 8. These force vectors are depicted adjacent position indicator 25 in FIG. 3. The centrifugal force vector 18 causes the higher viscosity particles 14 to migrate outwardly on solid viscosity differentiating adhesion means 8. The adhesion force vector 20 and the upward angling of solid viscosity differentiating adhesion means 8 result in the particles 14 migrating upwardly as they migrate outwardly. The higher viscosity fluid particles 14 may pass from one fiber to the next fiber of solid adhesion means 8 as the particles progress generally outwardly and upwardly, maintaining engagement with the fibers. The fluid component particles 14 may increase in size by combining with other such fluid component particles. The outward and upward migration of higher viscosity fluid particles 14 continues until the sum of the gravitational force vector 17 and the centrifugal force vector 18 overcomes the adhesion force vector 20. As each particle 14 achieves this point, indicated at position vector 25A in FIG. 3, it disengages from solid viscosity differentiating adhesion means 8, as indicated by particle 14A, and continues as a free falling body 14B as depicted at position indicator 25B.

The higher viscosity fluids, having a stronger adhesion force, in some instances migrate all the way out to ring 7 and collect there until further agglomeration result in their forming a mass large enough for the force vectors to cause disengagement.

It will be noted that the trajectory of the higher viscosity component fluid particles 14 has been significantly altered in comparison with that of the lower viscosity component fluid particles 15. The lower viscosity fluid particles 15 disengage at substantially the level of rotor plate 3 and then move outwardly and downwardly to lower receptacle 9. The higher viscosity fluid particles 15 migrate upwardly before disengaging and so are retained in second receptacle 10. The adjustment of the elevation of slip fitting 10A by means of adjusting screws 11 permits adjustment of the elevation of partition 10 to separate the trajectories of the higher viscosity fluid component particles 14 and the lower viscosity fluid component particles 15. Solid particles entrained in the fluid are retained on upper receptacle 12, achieving separation of solids from the separated fluid components in receptacles 9 and 10. Very high viscosity fluid particles might also be retained on upper receptacle 12.

Figure 4:
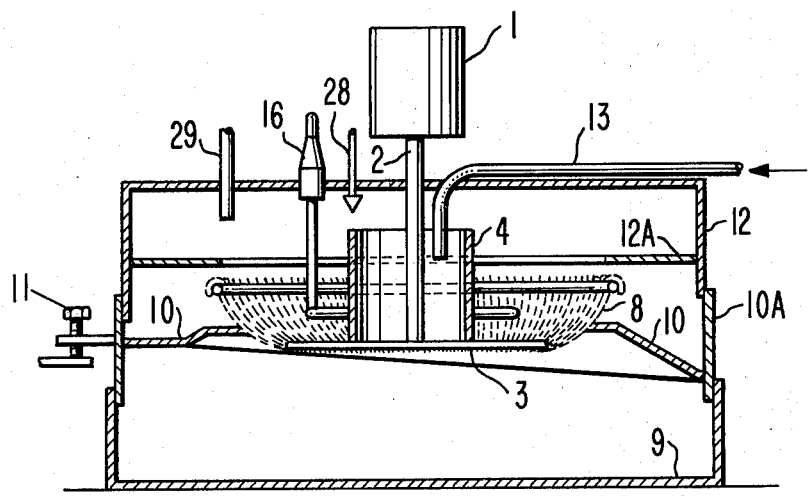
FIG. 4 is a sectional view of a slightly modified embodiment of apparatus in accordance with the present invention.

The inherent differences in the physical properties of the fluid components of the fluid body to be separated may be utilized to increase the difference between the viscosities of the fluid components by varying the environment within the apparatus. Where the viscosity of the component fluids to be separated varies disproportionately with temperature, the fluid body to be separated may be temperature controlled or heat may be added to or removed from the internal environment of the apparatus by temperature control means 28 in FIG. 4 to provide an optimum difference in viscosity between the component fluids, thereby enhancing the operating conditions by increasing the variance between the viscosities of the component fluids. Where the viscosity of the component fluids to be separated varies disproportionately with pressure, the pressure within the apparatus may be increased or decreased through pressure control duct 29 to control the pressure experienced by the fluid body to provide an optimum difference in viscosity between the component fluids, thereby enhancing the operating conditions by increasing the variance between the viscosities of the component fluids.

In fluid bodies comprised of polar and non-polar component fluids, the operating efficiency of the invention may be increased by the addition of a charged electrode 16, adjacent to the flow of the centrifugally accelerated fluid to produce an electrostatic field to cause the polar component fluid to agglomerate. Electrode 16 may be connected, for example, to a suitable source so that it is continuously charged with a potential in the order of about 20,000 volts direct current, or low frequency alternating current (below about 1 kilohertz), relative to the housing and rotor plate 3. This optimizing effect can be realized in fluid bodies, such as oil and water, wherein one component fluid is non-polar and the other component fluid is polar.

In fluid bodies comprised of organic and inorganic component fluids, where there are differences in the dielectric constants, additional electrodes can be added to enhance separation and reduce the amount of viscosity difference required for suitable separation operations in accordance with the present invention.

To enhance the purity level of one, or more, of the component fluids, intermediate partitions defining additional receptacles may be placed in the area between the particle trajectories of the fluid components, and the discharges of the receptacles can be refluxed back to the input through pipe 13.

To further enhance the purity level of one or more of the component fluids, the apparatus may be arranged in multiple stages wherein the component fluid receptacle discharges of the prior stages serve as the fluid body to be separated for the subsequent stage.

Rotor plate 3 has been depicted as horizontal, and solid adhesion means 8 has been depicted as angling upwardly from the plane of rotor plate 3. Other orientations could be utilized, however, so long as solid adhesion means 8 is angled with respect to the plane of flow induced by the centrifugal acceleration caused by rotation of rotor plate 3.

Although the present invention has been described with reference to preferred embodiments, numerous modifications and rearrangements could be made, and still the result would be within the scope of the invention.

I claim:

1. A method of physically separating fluid components of a fluid body having a plurality of fluid components of different viscosities, said method comprising supplying a fluid body to a solid, viscosity differentiating adhesion means; rotating said solid viscosity differentiating adhesion means to impart centrifugal force to the fluid body thereon, wherein fluid components of the fluid body separate from said solid, viscosity differentiating adhesion means to trajectories determined by the fluid component viscosities; and receiving fluid components from the trajectories in at least two receptacles.

2. A method as claimed in claim 1 in which the fluid body is supplied to the solid, viscosity differentiating adhesion means by applying the fluid body to a plate member which defines a plane and which contacts said solid, viscosity differentiating adhesion means; rotating the plate member about an axis normal to said plane to cause the fluid body to flow on the plate member and to transfer to said solid, viscosity differentiating adhesion means.

3. The method of claim 2 wherein the solid viscosity differentiating adhesion means is oriented at an acute angle with respect to the plate member plane.

4. The method of claim 3 wherein the acute angle is an angle of from about 5° to about 30°.

5. The method of claim 1 further comprising placing between the trajectories of the fluid components at least one partition to define at least two receptacles for collection of the fluid components.

6. The method of claim 1 further comprising introducing an electrostatic field adjacent to the solid, viscosity differentiating adhesion means.

7. The method of claim 1 further comprising varying the temperature of the said fluid body.

8. The method of claim 1 further comprising varying the pressure experienced by the fluid body.

9. The method of claim 1 further comprising refluxing at least one of the separated fluid components to attain improved separation of the fluid components.

10. Apparatus for physically separating fluid components of a fluid body having a plurality of fluid components of different viscosities, said apparatus comprising a solid, viscosity differentiating adhesion means; supply means for supplying to said solid, viscosity differentiating adhesion means a fluid body to be separated into fluid components of different viscosities; rotation means for rotating said solid, viscosity differentiating adhesion means to impart centrifugal force to a fluid body thereon, whereby fluid components of the fluid body separate from said solid, viscosity differentiating adhesion means in trajectories determined by the fluid component viscosities; and partition means defining at least two receptacles for receipt of fluid components from the trajectories.

11. Apparatus as claimed in claim 10 in which said rotation means comprises a plate member defining a plane and positioned to receive a fluid body from said supply means and in contact with said solid, viscosity differentiating adhesion means; and drive means for rotating said plate means about an axis normal to said plane to cause the fluid body to flow on said plate member and to transfer therefrom to said solid, viscosity differentiating adhesion means.

12. The apparatus of claim 11 wherein said solid viscosity differentiating adhesion means is oriented at an acute angle with respect to the plane.

13. The apparatus of claim 12 wherein the acute angle is an angle of from about 5° to about 30°.

14. The apparatus of claim 13 in which the plane is substantially horizontal.

15. Apparatus as claimed in claim 11 further comprising a distributor member for distributing the fluid body on said plate member.

16. The apparatus of claim 10 wherein said solid viscosity differentiating adhesion means comprises a fibrous mass having fibers of a thickness in the range of from about 6 mils to about 12 mils.

17. The apparatus of claim 10 further comprising an electrical conductor adjacent to the solid, viscosity differentiating adhesion means, and means for charging said electrical conductor.

18. The apparatus of claim 10 further comprising temperature control means for controlling the temperature adjacent said solid, viscosity differentiating adhesion means experienced by the fluid body.

19. The apparatus of claim 10 further comprising pressure control means for controlling the pressure adjacent said solid, viscosity differentiating adhesion means experienced by the fluid body.

20. The apparatus of claim 10 further comprising means for refluxing at least one of the component fluids.

21. An apparatus for effecting the physical separation of the fluid components of a fluid body having a plurality fluid component of different viscosities, said apparatus comprising a plurality of apparatus stages, each stage comprising apparatus as claimed in claim 10; and means interconnecting said plurality of apparatus stages for sequential flow of the fluid body therethrough.

22. Apparatus as claimed in claim 10 in which said partition means includes adjustment means permitting adjustment of at least one of said receptacles.

23. Apparatus as claimed in claim 10 in which said solid, viscosity differentiating adhesion means comprises clusters of longitudinally oriented fibrous material.

24. Apparatus as claimed in claim 23 in which said fibrous material is a fluorocarbon material.

25. Apparatus as claimed in claim 23 in which said fibrous material is stainless steel.

* * * * *